(12) United States Patent
Kliland et al.

(10) Patent No.: US 6,738,383 B1
(45) Date of Patent: May 18, 2004

(54) ARRANGEMENT FOR DISTRIBUTING AND DISPATCHING TRAFFIC IN A NETWORK, ESPECIALLY H.323 GENERATED TRAFFIC

(75) Inventors: Kevin Kliland, Ski (NO); Espen Skjæran, Oslo (NO); Knut Snorre Bach Corneliussen, Oslo (NO); Espen Iveland, Drammen (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/387,355

(22) Filed: Aug. 31, 1999

(30) Foreign Application Priority Data

Feb. 9, 1999 (NO) .......................................... 19990593

(51) Int. Cl.[7] .......................... H04L 12/28; H04L 12/66
(52) U.S. Cl. ........................ 370/401; 370/352; 370/392
(58) Field of Search ................................ 370/400, 401, 370/352, 389, 392, 356

(56) References Cited

U.S. PATENT DOCUMENTS

| | | | |
|---|---|---|---|
| 6,229,804 B1 * | 5/2001 | Mortsolf et al. .............. | 370/52 |
| 6,363,065 B1 * | 3/2002 | Thornton et al. ........... | 370/352 |
| 6,421,339 B1 * | 7/2002 | Thomas ...................... | 370/352 |
| 6,427,071 B1 * | 7/2002 | Adams et al. .............. | 455/403 |
| 6,452,925 B1 * | 9/2002 | Sistanizadeh et al. ....... | 370/352 |
| 6,490,275 B1 * | 12/2002 | Sengodan ................... | 370/356 |
| 6,519,249 B1 * | 2/2003 | Bennefeld et al. .......... | 370/352 |

FOREIGN PATENT DOCUMENTS

| | | |
|---|---|---|
| WO | WO 98/17048 | 4/1998 |
| WO | WO 99/14932 | 3/1999 |

OTHER PUBLICATIONS

"Call Signallling Protocols and Media Stream Packtetization for Packet–Based Multimedia Communication Systems," Series H: Audiovisual and Multimedia Systems, Infrastructure of Audiovisual Services—Transmission Multiplexing and Synchronization. International Telecommunication Union, H.225.0, 02/98, pp. i–144.

* cited by examiner

Primary Examiner—Seema S. Rao
Assistant Examiner—Ron Abelson

(57) ABSTRACT

The present invention relates to an arrangement for distributing and dispatching traffic in a network, especially H.323 generated traffic, which arrangement comprises one or more gatekeepers, here designated as so-called external or real gatekeepers, and for the purpose of utilizing such real gatekeepers in a far more efficient and cost saving manner, and also for avoiding reconfiguration of endpoints depending on which gatekeepers with which they want to communicate, the present invention suggests a solution characterized by the introduction of one or more internal gatekeepers, here also designated as so-called internal lightweight gatekeepers, each such internal gatekeeper basically understanding any message used by any endpoint when registering to a real gatekeeper.

11 Claims, 4 Drawing Sheets

ARRANGEMENT FOR DISTRIBUTING AND DISPATCHING TRAFFIC IN A NETWORK, ESPECIALLY H.323 GENERATED TRAFFIC

FIELD OF THE INVENTION

The present invention relates to an arrangement for distributing and dispatching traffic in a network, especially H.323 generated traffic, which arrangement comprises one or more gatekeepers, here designated as so-called external or real gatekeepers.

THE PROBLEM AREAS

Today there does not exist any lightweight solution for distributing and dispatching H.323 generated traffic.

KNOWN SOLUTIONS AND PROBLEMS WITH THESE

It is perfectly possible to distribute and dispatch H.323 by using a gatekeeper. It might however be costly to run a full fledge gatekeeper for distributing and dispatching H.323 generated traffic if the intention only is to distribute and dispatch H.323 generated traffic. A real gatekeeper is complex and has to know about lots of messages etc. described in H.323. An endpoint may be any kind of H.323 based equipment.

In H.323 version 2, redundancy of gatekeepers are described, where one gatekeeper is instructing the endpoint to contact another known gatekeeper if itself can not fulfil the service requested. It requires however that endpoints understand version 2 of the protocol, and interpret the message fields. This solution is not applicable for load balancing, as it has no mechanism for one real gatekeeper to know of the other, or any mechanism to report load between them.

OBJECTS OF THE INVENTION

An object of the present invention is to provide an arrangement by which the distribution and dispatch of H.323 generated traffic can be provided in a far more expedient and less costly manner.

Another object of the present invention is to provide an arrangement by which endpoints can be put in contact with so-called external or real gatekeepers without having to be reconfigured depending on which gatekeeper they want to communicate with.

A further object of the present invention is to provide an arrangement by which supplementary achievements, comprising for example load balancing, QoS (Quality of Service), information about cost, etc. can easily be implemented.

Still another object of the present invention is to provide an arrangement by which the messages associated with so-called external or real gatekeepers are utilised in a rational and effective manner.

BRIEF DISCLOSURE OF THE INVENTION

The above objects are achieved in an arrangement as stated in the preamble, which according to the present invention is characterized by the introduction of one or more internal and lightweight gatekeepers, where internal means that they are arranged in a certain domain, and they are lightweight in the sense that each gatekeeper support a limited range of the H.323 message set, each such lightweight gatekeeper basically understanding any message used by any endpoint when registering to a real gatekeeper and that each lightweight gatekeeper is adapted to put an endpoint of its domain in contact with an external or real gatekeeper, outside said domain.

In other words, the present invention performs the H.323 distribution and dispatch by utilising an extreme lightweight gatekeeper that basically understands the GRQ (Gatekeeper Request), GCF (Gatekeeper Confirm) and GRJ (Gatekeeper Reject) H.323 RAS messages.

These messages are stated in H.225 and are used by endpoints when registering to a gatekeeper. Such a lightweight gatekeeper is able to put an endpoint within the lightweight gatekeeper's domain in contact with a full fledge or real gatekeeper outside its own domain.

How to achieve supplementary achievements as e.g. load balancing is also described in the text below. Some of the ways described here not only involves GRQ, GCF and GRJ.

Further features and advantages of the present invention will appear from the following description taken in conjunction with the enclosed drawings.

DETAILED DESCRIPTION OF EMBODIMENTS

An endpoint that wants to initiate a session towards another endpoint has first to register to a gatekeeper. An endpoint performs this by sending a GRQ (see FIG. 1 $GRQ_1$) to the lightweight gatekeeper. The lightweight gatekeeper only understands and responds to GRQs. As the lightweight gatekeeper also has knowledge of real gatekeepers outside its own domain, it responds to the endpoint with a GCF (see FIG. 1 $GRQ_4$) with the gatekeeper id of an appropriate full fledge gatekeeper outside its own domain. In advance the lightweight gatekeeper must have gained knowledge of valid gatekeepers outside its domain (information like IP address). The method for gaining and updating the knowledge of external gatekeepers is described in the text below, in connection with the discussion of FIG. 4. In addition, each time an endpoint connects to the lightweight gatekeeper, the lightweight gatekeeper should use the same signals, i.e. GRQ (see FIG. 1 $GRQ_2$) and GCF (see FIG. 1 $GRQ_3$), towards the real gatekeepers e.g. to check which gatekeepers that allow the endpoint to be connected.

Figure 1:
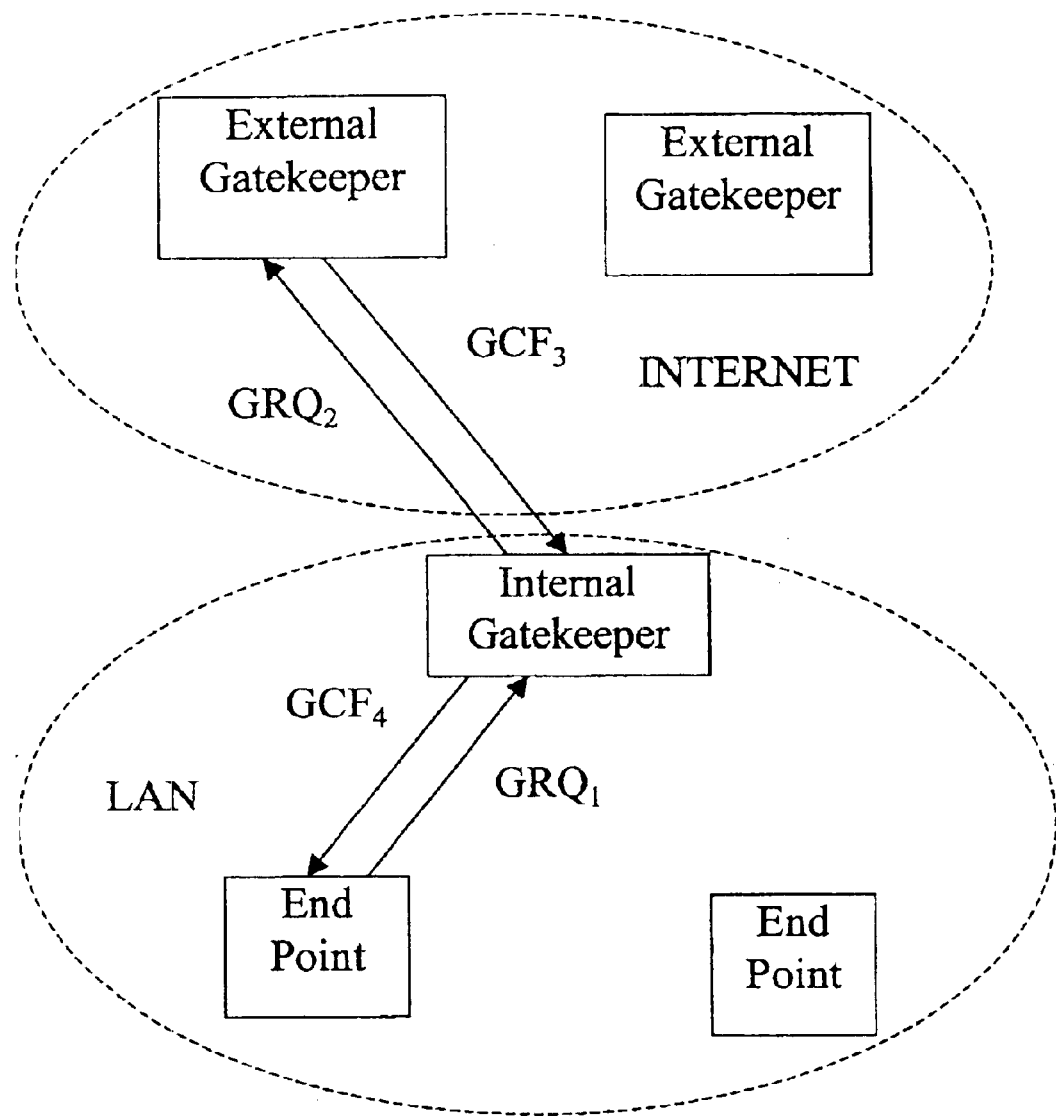
FIG. 1 is a sketch of a typical scenario in which the distributed gatekeeper system might be utilised with endpoints, internal (lightweight) gatekeeper located inside the domain or LAN and external (real) Gatekeepers located outside. The network components as e.g. routers etc. are not outlined.
Figure 2:
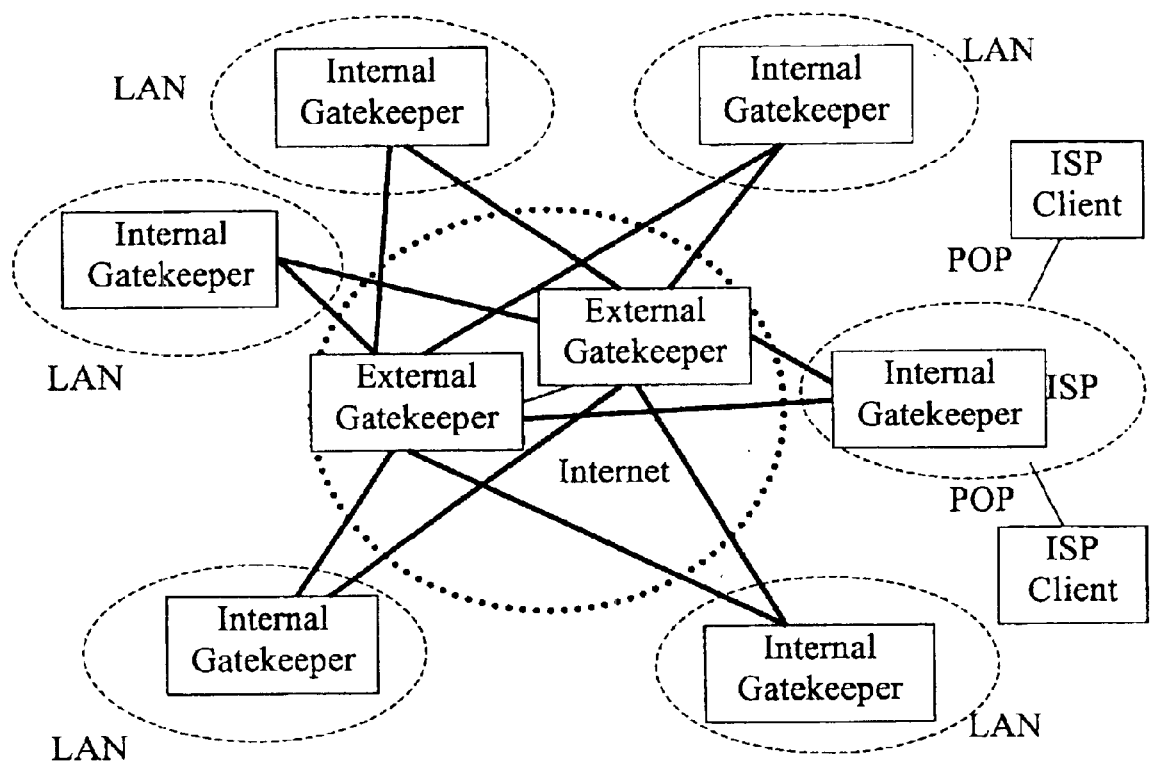
FIG. 2 is a network scenario in which the distributed gatekeeper system may be applied. Not all of the components within the ISP domain are outlined, neither is network-related equipment as e.g. routers etc. outlined. An example of a LAN domain is sketched in FIG. 1. The internal gatekeepers may be connected in any way and any number towards the external gatekeepers. An arbitrary number of external gatekeepers may be connected.

FIG. 1 only indicates one possible scenario on how the lightweight gatekeeper communicates with the real gatekeepers. Alternatively the internal gatekeeper may directly provide the address or an external gatekeeper in the GCF towards the endpoint as a response to the GRQ. FIG. 2 indicates how the arrangement is deployed when taking ISPs, LAN and Internet into account.

Load balancing may be obtained through the inventive method. The lightweight gatekeeper has knowledge of valid real gatekeepers' load and, on this basis, the lightweight gatekeeper might distribute the traffic towards the least loaded gatekeeper.

Figure 3:
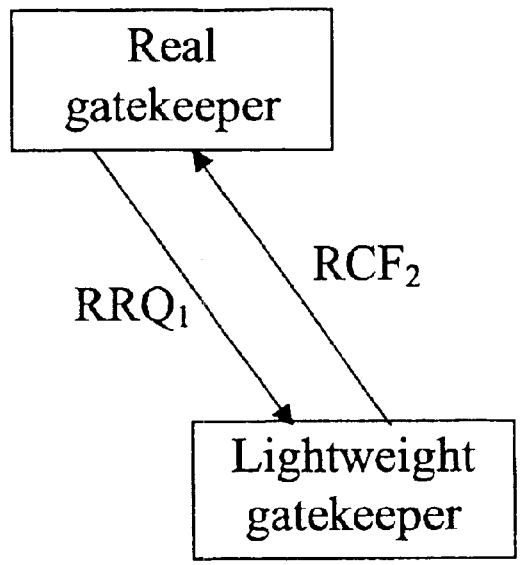
FIG. 3 shows the message exchange during start up of a real gatekeeper, when the real gatekeeper register a lightweight gatekeeper.

Each real gatekeeper should be configured to know a lightweight gatekeeper, and should register with this during start-up. This can be done using Registration Request (RRQ). The lightweight gatekeeper replies with Registration Confirm (RCF) including an endpoint identifier, which the real gatekeepers may use in future communication with the lightweight gatekeeper, and adds the real gatekeeper to its internal list of gatekeepers. See FIG. 3.

The ResourceAvailablityIndication (RAI) and ResourceAvailabilityConfirm (RAC) messages (RAS protocol, [1]), are described for use between gateways and gatekeepers. The gateway sends the indication, either periodically, or when the resource situation has changed, to the gatekeeper, which uses this information when picking the gateway a given call is routed to.

This invention utilizes this mechanism between a real gatekeeper and the extended lightweight gatekeeper, in order for the lightweight gatekeeper to make more intelligent choices when forwarding the GRQ message to the gatekeeper that will actually be used for registration and call routing.

Figure 4:
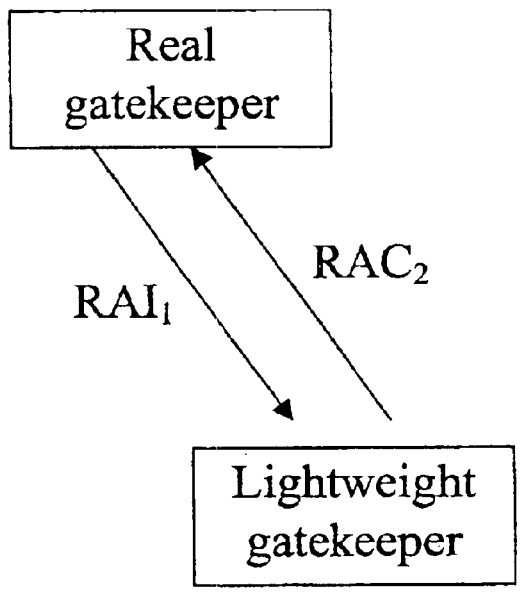
FIG. 4 shows the message transfer in communication between real and lightweight gatekeeper, as the lightweight gatekeeper collects information relating to e.g. the load situation of the real gatekeeper.

A real gatekeeper sends RAI with the endpoint identifier received during registration and its resource situation (see FIG. 4). The list of gatekeepers in the lightweight gatekeeper will now be updated with resource information so that the gatekeeper dispatcher will not forward a GRQ to a gatekeeper which has indicated that it is almost out of resources.

As an alternative to using RAI/RAC, the proprietary non-StandardData field of GCF and GRJ might be used for exchanging e.g. QoS information between the lightweight gatekeeper and the real gatekeepers. If the lightweight gatekeeper keeps track of each real gatekeeper's e.g. QoS, e.g. in a table form, these tables may be updated each time the lightweight gatekeeper receives a GCF or GRJ from a real gatekeeper. The lightweight gatekeeper will then read the nonStandardData field of these messages and update its tables. In the same way the clients may indicate their willingness to pay and hence achieve corresponding e.g. QoS by using the nonStandardData field of the GRQ message.

A simple example of how to utilise the nonStandardData field: E.g. load information might be exchanged between a real gatekeeper and the lightweight gatekeeper by stating that the first byte of the nonStandardData field in the GCF message shall contain an integer indicating the gatekeeper's load. The same idea applies for exchanging other kind of data.

Other ways of exchanging information not involving the non-StandardData field of GCF, GRJ and GRQ are described below.

The lightweight gatekeeper should also be able to handle registration requests (RRQ) from endpoints, but should always reject them (RRJ) with reason discovery required, to enforce endpoints with manual discovery (configured gatekeeper address) to send GRQ.

As this solution is done transparent to the endpoint, it is not required to support version 2 of H.323, or to interpret all the parameters in the messages.

Figure 5:
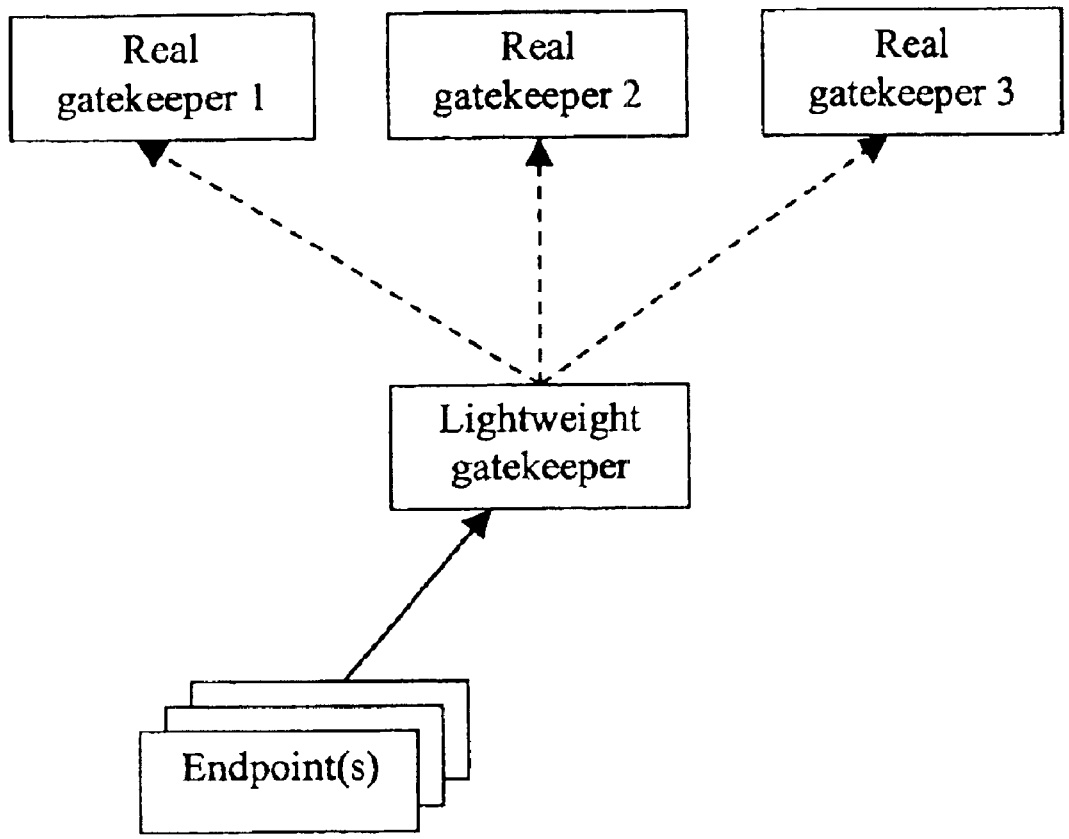
FIG. 5 gives a system overview.

The situation between endpoints, lightweight gatekeeper and real gatekeepers are shown in FIG. 5. As the lightweight gatekeeper holds very little cached information (the registrations) there is no need for redundancy for this entity, and it may restart automatically after an unexpected crash. By using a "a time to live" parameter in the real-lightweight registrations, the real gatekeepers will automatically re-register at a given interval, and the system is up again. No calls are lost during this period.

Transfer of registered endpoints from one gatekeeper to another, e.g. during shutdown of one gatekeeper for software upgrade, may be done by first unregistering the gatekeeper from the lightweight gatekeeper, and then unregister all registered endpoints. Normally, an endpoint then tries to re-register. This attempt should be rejected with reason discovery required, thereby forcing the endpoint to send GRQ to the lightweight gatekeeper. In this way, gatekeeper redundancy is also achieved for version 1 endpoints, which can not understand the required version 2 fields for gatekeeper redundancy.

Network resource management will be simplified since one node (the lightweight gatekeeper) now knows the resource situation of all the gatekeepers "belonging" to it.

QoS might also be obtained through the approach according to the present invention. If the lightweight gatekeeper is able to and has obtained knowledge of which level of QoS the different gatekeeper providers are able to provide, this information might be utilised for connecting the endpoints to the gatekeeper with the Qos level in mind. An endpoint might not always want to connect to the gatekeeper providing the best QoS because higher QoS might mean higher charge.

Information of the (current) cost of using the different full fledge gatekeepers might also be provided by the same approach as described for load balancing and QoS.

Information Flow Between the Lightweight Gatekeeper and the Real Gatekeepers

Several alternatives exist regarding how often the lightweight gatekeeper ought to communicate with the external gatekeepers and hence update the internal tables:

1) The lightweight gatekeeper may update its internal tables statically, i.e. by management. An example of a static configuration setting may be that between 0800 and 1000 a certain external gatekeeper doesn't want to handle GRQs coming from the lightweight gatekeeper.

2) The lightweight gatekeeper may update its internal tables partly dynamically, i.e. e.g. on GCF, GRJ and RAI received from the real gatekeepers.

3) Other H.225 or H.245 messages might be utilised for such information exchange, e.g. the H.225's TRQ (InfoRequest) and IRR (InfoResponse)

4) Other ways of exchanging such information also exist. Examples may be to use other protocols like TCP, UDP or such as Java/RMI, CORBA etc.

Any combination of the above mentioned approaches may be applied. Besides, information on a client's willingness to pay might be forwarded in the GRQ message, see next chapter.

Information Flow Between Endpoints and the Lightweight Gatekeeper

Information that might flow from endpoints to the lightweight gatekeeper is e.g. willingness to pay information. Hence the lightweight gatekeeper, dependent of the frequency, has valid knowledge of the endpoints, e.g. willingness to pay.

The way in which this information might be exchanged is according to those mechanism described in previous chapter.

Which Real Gatekeeper to Put an Endpoint in Touch With

Another issue is which real gatekeeper the lightweight gatekeeper should put an endpoint in contact with. Alternatives may be:

1) Forward the GRQ to a randomly picked real gatekeeper
2) Forward the GRQ based on internal information. Examples of internal information might be QoS, load, cost, time of day etc.
3) Forward the GRQ to a specific real gatekeeper on the basis of other criterias
4) By forward is meant explicitly, i.e. plain forward of the GRQ to an external gatekeeper, or implicitly, i.e. the address of the external gatekeeper is directly provided in the internal gatekeeper's GCF towards the endpoint Advantages Such an extremely lightweight gatekeeper is trivial to implement and only needs small amount of memory and CPU power. Due to these modestly demanding requirements it does not have to execute on dedicated hardware (PCs, workstations etc.) An advantage that is a consequence of the lightweight approach, is that e.g. a small company that thinks it is too costly to put up an own local gatekeeper might initiate contracts with one or several gatekeeper providers.

Such a distributed approach is trivial to maintain due to the fact that all the endpoints only needs to know about one gatekeeper, i.e. the lightweight gatekeeper. If the endpoints communicate directly with the real gatekeepers, the endpoints have to be reconfigured depending on which gatekeepers they want to communicate with.

This invention has the great advantage that it allows a system of multiple gatekeepers to distribute load evenly, thereby reducing call setup time and improving the total possible utilization compared to the statical endpoint-gatekeeper relationship.

Further the gatekeepers are able to recover automatically after a crash, without any external intervention.

Another advantage of the invention is the possibility of transferring registered endpoints from one gatekeeper to another.

References

[1] "Call Signaling Protocols and Media Stream Packetization for Packet Based Multimedia Communications Systems", DRAFT ITU-T Recommendation H.225.0, Version 2

What is claimed is:

1. An internal gatekeeper for distributing and dispatching traffic in a network, wherein:
   the traffic is based on ITU-T-recommendation H.323;
   the internal gatekeeper is arranged in a specific domain and is adapted to put an endpoint of the specific domain in contact with an external real gatekeeper placed outside the specific domain, the external real gatekeeper supporting a full H.323 message set;
   the internal gatekeeper supports a subset of the H.323 message set used by any endpoint when registering to an external real gatekeeper, the subset including GRQ (Gatekeeper Request), GCF (Gatekeeper Confirm), GRJ (Gatekeeper Reject), IRR (Information Request Response), IRQ (Information Request), RAI (Resource Availability Indication), RAC (Resource Availability Confirm), RRQ (Registration Request), RCF (Registration Confirm), and RRJ (Registration Reject);
   the internal gatekeeper is arranged to maintain a list or table of valid real gatekeepers; and
   the external real gatekeeper is arranged to register an internal gatekeeper during start-up.

2. The internal gatekeeper as claimed in claim 1, wherein said table is supplemented with resource information indicating the load on each particular real gatekeeper.

3. The internal gatekeeper as claimed in claim 2, wherein said table is supplemented with information relating to quality of service (QoS) and cost.

4. The internal gatekeeper as claimed in claim 3, wherein a proprietary non-StandardData field of the GCF and GRJ messages are used for exchanging information between the internal gatekeeper and any external real gatekeeper, the non-StandardData field being used to convey information used in supplementary fields of said table.

5. The internal gatekeeper as claimed in claim 4, wherein the proprietary non-StandardData field of the GRQ message is used to communicate at least one of a desired cost leveland type of QoS of the external real gatekeeper.

6. The internal gatekeeper as claimed in claim 4 or 5, wherein a first byte of the non-StandardData field in the GCF message is arranged to contain an integer indicating a load on the real gatekeeper.

7. The internal gatekeeper as claimed in claim 1, wherein the table is updated statically.

8. The internal gatekeeper as claimed in claim 1, wherein the table is updated dynamically on GCF, GRJ and RAI received from any external real gatekeeper.

9. The internal gatekeeper as claimed in any of claim 1, wherein the internal gatekeeper is adapted to put an endpoint in contact with an external real gatekeeper by forwarding the GRQ to a randomly picked external real gatekeeper.

10. The internal gatekeeper as claimed in claim 1, wherein the internal gatekeeper is adapted to communicate with a plurality of endpoints, said plurality of endpoints only knowing about said one internal gatekeeper and thereby avoiding reconfiguration.

11. The internal gatekeeper as claimed in claim 1, wherein the internal gatekeeper is adapted to put an endpoint in contact with an external real gatekeeper by forwarding the GRQ based on information in said internal table.

* * * * *